No. 614,287. Patented Nov. 15, 1898.
C. C. CALL.
PUNCTURE REPAIR TOOL FOR PNEUMATIC TIRES.
(Application filed Sept. 22, 1898.)
(No Model.)
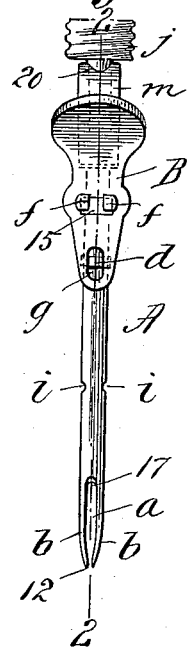
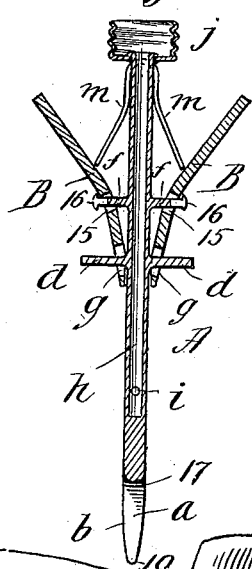
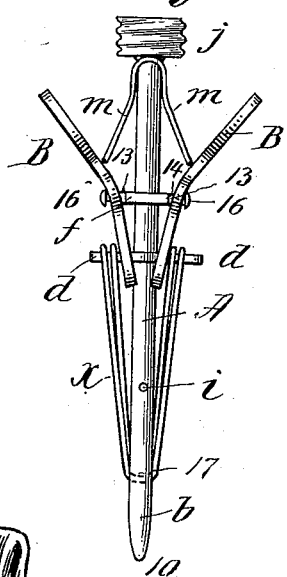
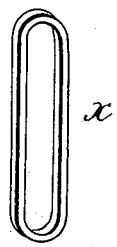
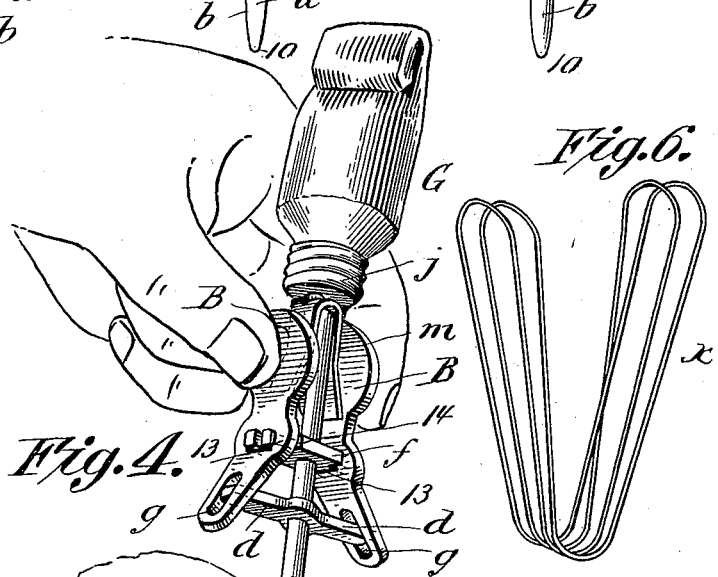
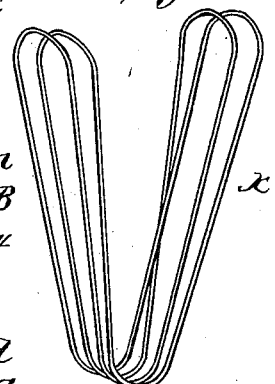
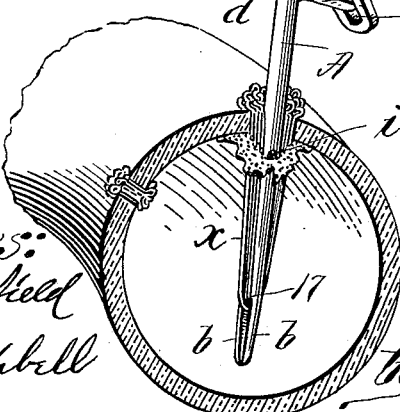
Witnesses:
Inventor
Charles C. Call,
by Wm. F. Bellows,
Attorney.
THE NORRIS PETERS CO., PHOTO-LITHO., WASHINGTON, D. C.

UNITED STATES PATENT OFFICE.

CHARLES C. CALL, OF SPRINGFIELD, MASSACHUSETTS.

PUNCTURE-REPAIR TOOL FOR PNEUMATIC TIRES.

SPECIFICATION forming part of Letters Patent No. 614,287, dated November 15, 1898.

Application filed September 22, 1898. Serial No. 691,600. (No model.)

*To all whom it may concern:*

Be it known that I, CHARLES C. CALL, a citizen of the United States of America, and a resident of Springfield, in the county of Hampden and State of Massachusetts, have invented certain new and useful Improvements in Puncture-Repair Tools for Pneumatic Tires, of which the following is a full, clear, and exact description.

The object of this invention is to provide a small, compact, simple, and inexpensive device for employment in conjunction with an ordinary rubber band for closing punctures in pneumatic tires, rendering it possible to quickly, conveniently, and permanently close the punctures.

The invention consists in a puncture-repair device constructed and adapted to be operated substantially as hereinafter described, and set forth in the claims.

Reference is to be had to the accompanying drawings, in which the present improved puncture-repair device is illustrated.

Figure 1 is a side view of the device. Fig. 2 is a central vertical section taken on the line 2 2, Fig. 1. Fig. 3 is a side view of the device shown as turned at right angles to the position shown in Fig. 1 and showing a common rubber band properly placed while in a stretched condition in connection with the device in readiness to be applied for closing the puncture in a tire. Fig. 4 is a perspective view showing the manner of manipulating the device for closing the puncture in a tire, this view also showing the aspect of a puncture which has been repaired, as by the present tool. Fig. 5 represents in perspective an ordinary rubber band such as is employed in conjunction with the repair-tool; and Fig. 6 is a perspective view in the nature of a diagram showing the course of stretched portions of the rubber band and indicating the relative positions of such portions when the rubber band is stretched and doubled on the tool in the manner shown in Fig. 3.

Similar characters of reference indicate corresponding parts in all of the views.

In the drawings, A represents the straight rod or stem constituting the center of the device, the same having its forward end split, as performed by a saw-kerf, leaving the slot $a$ and the opposite nib-like members $b\ b$, the points of which are rounded, as shown at 10, and the members $b\ b$ are approached, as shown at 12, Fig. 1, in the manner of the nibs of a ruling-pen, so as to permit easy entrance of the stem through a comparatively small puncture without tearing the margin thereof or enlarging the hole.

Intermediate between the point and the upper end of the stem A the said stem is provided with the rigid oppositely-extended arms or studs $d\ d$, and above said arms the stem has formed, as part thereof or affixed thereto, the similarly oppositely extended lugs $f f$, constituting the pivotal supports for the slightly-angular levers B B. The ends of the lugs $f f$ are necked down, as indicated at 13, with the shoulders 14 at the bases of the necked-down portions, while the elbow portions of the levers are perforated, as shown at 15, to fit over the said necked-down portions of the stud, the outer ends of the latter being headed or upset, as shown at 16, to prevent the displacement of the levers from their pivotal or rocking engagements on the supporting-studs therefor. The lower portions of the said levers are recessed or apertured, as indicated at $g$, to straddle the aforesaid studs $d\ d$.

The stem A is formed tubular from its upper end, the axial passage $h$ therein extending downwardly to a point somewhat above the crotch 17, at which the lateral perforations $i$ outwardly lead.

The upper end of the rod or stem A is provided with the enlarged threaded cup-like socket $j$ for receiving connection therewith with the threaded nozzle of a collapsible tube or can, such as indicated at G in Fig. 4, whereby rubber cement may be injected through the tubular stem or needle.

$m\ m$ represent oppositely-reacting springs provided at the upper end portion of the stem for a spreading pressure on the upper members of the levers B B, correspondingly normally maintaining the lower members of said levers in their disposition (shown in Figs. 2 and 3) closely against the opposite sides of the stem and within the ends of the arms $d\ d$. In order to provide and apply these springs in a simple and practical manner, I form both springs of a single thin strip or sheet of metal, which I centrally perforate, as shown at 20, then bend the strip into U form and outwardly spread the extremities, the perforated bent part of the spring being fitted over the tube before the cup-shaped screw-socket $j$ is secured in place.

In carrying the device into operation I take a rubber band $x$ of the most common form and larger or smaller, according as the puncture is large or minute, and place one loop of the band on the one side stud $d$, then stretch the band and carry an intermediate part thereof between the nibs $b\ b$, and then pass a bight of both strands over the other side stud, returning an intermediate part of both strands again between the nibs, passing a second bight over the stud first engaged and returning the extremity of the strand back again between the nibs and engaging the other end loop with the opposite stud. The band may be so stretched as to permit of a greater number of doublings, so that there will be as many strands extending from the crotch 17 upwardly to the engaging stud $b$ as may be deemed advantageous to accord with the character of any given puncture. The rubber is then wet to enable it to easily pass through the puncture with the rod A, which is inserted for such a distance that the orifices $i\ i$ are carried beyond the inner wall of the tire. The cement is then injected, issuing through the orifices $i\ i$ and becoming sufficiently incorporated on and within the several strands, and then the levers B B are operated in the manner shown in Fig. 4, casting off the loops of the rubber from the studs $d\ d$ and quickly withdrawing the stem, leaving the looped ends of the strands which fill the puncture in compact bunches, as represented at the left of Fig. 4. The cement introduced in the manner explained fills the interstices between the strands which pass through the puncture and also, with the bunched-up looped ends on the interior of the tire, forms a homogeneous mass, which effectually prevents all leakage of air.

With the tool may be provided a straight rod to be forced down into the tubular stem from the top to or beyond the orifices $i$ for the purpose of clearing the tubular stem of any cement which may have been left therewithin after the collapsible or other cement-containing can or tube has been detached.

Having thus described my invention, what I claim, and desire to secure by Letters Patent, is—

1. A puncture-repair tool consisting of a rod or stem having at its forward end the longitudinal slot, and provided back of said forward end with the opposite outwardly-extending studs $d\ d$ adapted for the engagement therewith under tension of a rubber band substantially as described, and a device mounted on the rod and movable relative to said studs for forcing the rubber band from its engagement therewith.

2. A puncture-repair tool consisting of a rod or stem having at its forward end the longitudinal slot and provided back of said forward end with the opposite outwardly-extending studs $d\ d$ combined with lever-arms pivotally mounted on the rod having members thereof adapted to swing adjacent said stud and serving as cast-off devices, substantially as and for the purpose set forth.

3. In a puncture-repair tool, the combination with the rod or stem A having the bifurcated forward end and provided with the studs $d\ d$ and the studs $f\ f$, of the levers B B pivotally mounted on the said studs $f\ f$, and having their lower extremities adapted for swinging movement adjacent the studs $d\ d$, and springs for normally maintaining the lower members of the levers inwardly disposed, substantially as and for the purpose described.

4. In a puncture-repair tool, the combination with the rod or stem A having intermediate of its length the opposite outwardly-extended studs $d\ d$, and provided thereabove with the opposite outwardly-extended lugs $f\ f$ having the necked-down and shouldered formations, of the angular levers B B having the perforations 15 at their elbows to set over said necked-down portions of the lugs $f$ and having their lower extremities apertured to straddle the said studs $d\ d$, said lugs having their ends headed or upset and the springs applied to said levers, substantially as and for the purpose set forth.

5. In a puncture-repair tool, in combination, the stem A having the bifurcated forward end and with an axial passage therewithin leading from its upper end partially to the forward end and having the orifices $i\ i$, and provided with the studs $d\ d$ and the lugs $f\ f$ necked down and shouldered as shown, the angular levers B B having at their elbow portions the perforation 15 fitted for rocking support over said necked-down portions of said lugs and having their lower extremities provided with apertures whereby they straddle over the said studs $d\ d$, the extremities of said lugs being headed, the double spring consisting of a single strip of sheet metal intermediately perforated and bent into U form with its extremities outwardly divergent, and having its centrally-apertured and bent portion engaged over the upper end portion of the tubular stem, and the cup-shaped threaded socket-piece $j$ secured on the upper end of the tubular stem, next above the bowed part of the double spring, all substantially as described and shown.

CHARLES C. CALL.

Witnesses:
WM. S. BELLOWS,
M. A. CAMPBELL.